US 12,403,988 B2

(12) United States Patent
Yim et al.

(10) Patent No.: US 12,403,988 B2
(45) Date of Patent: *Sep. 2, 2025

(54) CORNER STRUCTURE AND LIQUEFIED GAS STORAGE TANK HAVING SAME

(71) Applicant: KOREA GAS CORPORATION, Daegu (KR)

(72) Inventors: Ki Ho Yim, Seoul (KR); Yong Bum Cho, Seoul (KR); Young Chul Yang, Gyeonggi-do (KR); Heung Seok Seo, Gyeonggi-do (KR); Yeongbeom Lee, Incheon (KR); Youngkeun Yoon, Incheon (KR); Hae Chul Han, Incheon (KR); Byungteak Oh, Incheon (KR); Eunyoung Yun, Incheon (KR)

(73) Assignee: KOREA GAS CORPORATION, Daegu (KR)

( * ) Notice: Subject to any disclaimer, the term of this patent is extended or adjusted under 35 U.S.C. 154(b) by 44 days.

This patent is subject to a terminal disclaimer.

(21) Appl. No.: 18/036,890

(22) PCT Filed: Jan. 6, 2021

(86) PCT No.: PCT/KR2021/000114
§ 371 (c)(1),
(2) Date: May 15, 2023

(87) PCT Pub. No.: WO2022/119045
PCT Pub. Date: Jun. 9, 2022

(65) Prior Publication Data
US 2023/0415856 A1 Dec. 28, 2023

(30) Foreign Application Priority Data

Dec. 3, 2020 (KR) .................. 10-2020-0167214

(51) Int. Cl.
*F17C 3/02* (2006.01)
*B63B 25/16* (2006.01)
*B65D 90/04* (2006.01)

(52) U.S. Cl.
CPC .............. *B63B 25/16* (2013.01); *B65D 90/04* (2013.01); *F17C 3/027* (2013.01);
(Continued)

(58) Field of Classification Search
None
See application file for complete search history.

(56) References Cited

U.S. PATENT DOCUMENTS

| | | | |
|---|---|---|---|
| 6,374,761 B1* | 4/2002 | Dhellemmes | F17C 13/001 220/901 |
| 7,717,288 B2* | 5/2010 | Yang | B63B 25/14 220/560.07 |

(Continued)

FOREIGN PATENT DOCUMENTS

| | | |
|---|---|---|
| JP | 2002181288 | 6/2002 |
| KR | 1006493170000 | 11/2006 |

(Continued)

OTHER PUBLICATIONS

"English translation of Office Action of Korea Counterpart Application", issued on Nov. 25, 2021, pp. 1-5.

(Continued)

*Primary Examiner* — Mollie Impink
(74) *Attorney, Agent, or Firm* — JCIPRNET

(57) ABSTRACT

Disclosed is a corner structure (100) of a liquefied gas storage tank, the corner structure (100) being installed on a corner of a liquefied gas-carrying storage tank to support sealing walls (51, 52) that prevent the liquefied gas from leaking. The corner structure (100) comprises: two insulation members (110) arranged, oriented in different directions, on the inner surface of structural walls of a ship; and operational members (130) which are disposed on respective insulation members (110), and to which the support sealing walls (51, 52) adhere. The operational members (130) may be attached to the insulation members (110) so as to allow sliding against same.

12 Claims, 10 Drawing Sheets

(52) U.S. Cl.
CPC .............................. *F17C 2201/052* (2013.01);
*F17C 2203/0358* (2013.01); *F17C 2221/033*
(2013.01)

(56) References Cited

U.S. PATENT DOCUMENTS 11,674,643 B2 *   6/2023   Sassi .................. F17C 3/04
                                                  141/1
2017/0159888 A1 *   6/2017   Han ................... B63B 25/16

FOREIGN PATENT DOCUMENTS

| KR | 1020120013247 | 2/2012 | | |
|----|---------------|--------|---|---|
| KR | 1020120039861 | 4/2012 | | |
| KR | 101669532 | 10/2016 | | |
| KR | 101865167 | 6/2018 | | |
| KR | 1021295610000 | 7/2020 | | |
| WO | WO-2019012237 A1 * | 1/2019 | .............. | F17C 3/027 |
| WO | WO-2019215404 A1 * | 11/2019 | .............. | F17C 3/027 |

OTHER PUBLICATIONS

"Search Report of Europe Counterpart Application", issued on Sep. 13, 2024, pp. 1-7.

* cited by examiner (a)

(b)

CORNER STRUCTURE AND LIQUEFIED GAS STORAGE TANK HAVING SAME

TECHNICAL FIELD

The present disclosure relates to a corner structure of a liquefied gas storage tank, and more particularly, to a corner structure arranged to install a sealing wall at a corner portion of a liquefied gas storage tank for storing liquefied gas, which is a liquid in a cryogenic state.

BACKGROUND ART

In general, liquefied gas includes liquefied natural gas (LNG), liquefied petroleum gas (LPG), liquefied ethane gas, liquefied ethylene gas, liquefied nitrogen, liquefied carbon dioxide, liquefied ammonia, and the like.

For example, LNG is liquefied natural gas which is one of a fossil fuel, and LNG storage tanks are classified into onshore storage tanks installed on the ground or buried in the ground and mobile storage tanks installed in transportation vehicles, such as cars and vessels, depending on locations where the LNG storage tanks are installed.

Liquefied gases, such as LNG and LPG described above have a risk of explosion when exposed to impact and are stored in a cryogenic state, and thus, storage tanks for storing LNG or LPG have a structure in which impact resistance and fluid-tightness are firmly maintained.

Also, compared to onshore storage tanks with little mobility, liquefied gas storage tanks installed in vehicles and ships with mobility should take measures against mechanical stress caused by mobility. However, since a liquefied gas storage tank installed in a vessel equipped with countermeasures against mechanical stress may also be used for in an onshore storage tank, a structure of a liquefied gas storage tank installed in a vessel will be described as an example in this specification.

A vessel in which a storage tank for a liquefied gas, such as LNG, is installed usually has a dual structure hull including an outer wall forming the exterior and an inner wall formed inside the outer wall. The inner wall and the outer wall of the vessel may be connected by a connecting wall to be integrated, and in some cases, vessels may include a hull having a unitary structure without the inner wall.

Also, the inside of the hull, i.e., the inside of the inner wall, may be divided by one or more bulkheads. The bulkhead may be formed by a known cofferdam installed in a typical LNG carrier or the like.

Each of internal spaces divided by the bulkhead may be utilized as a storage tank storing cryogenic liquid, such as LNG.

Here, an inner circumferential wall surface of the storage tank is sealed in a fluid-tight state by a sealing wall. That is, the sealing wall forms one storage space by integrally connecting a plurality of metal plates to each other by welding, and accordingly, the storage tank may store and transport LNG without leakage.

This sealing wall is connected to the inner wall or bulkhead of the vessel by a plurality of anchor structures. Therefore, the sealing wall cannot be moved relative to the hull.

An insulating wall is disposed between the sealing wall and the inner wall or bulkhead to form an insulating layer. The insulating wall may include a corner structure disposed at a corner portion of the storage tank, an anchor structure disposed around the anchor member, and a planar structure disposed at a flat portion of the storage tank. That is, the overall insulating layer may be formed in the storage tank by the corner structure, the anchor structure, and the planar structure.

Here, the anchor structure includes an anchor member directly connecting and fixing the hull to the sealing wall and an insulating member installed around the anchor member.

In addition, the sealing wall is mainly supported by the anchor structure, and the planar structure only supports a load of LNG applied to the sealing wall, and there is no direct coupling between the planar structure and the anchor structure.

FIG. 1 is a cross-sectional view illustrating a portion of a corner of an LNG storage tank according to the related art.

In a related art LNG storage tank 10 shown in FIG. 1, secondary insulating walls 22, 32, and 42 and primary insulating walls 24, 34, and 44 are sequentially installed on an inner wall 12 or a bulkhead 14, which is a hull structure, to insulate the inside and outside of the storage tank. In addition, secondary sealing walls 23, 33, and 43 are installed between the secondary insulating walls 22, 32, 42 and the primary insulating walls 24, 34, and 44, and a primary sealing wall 50 is installed on surfaces of the primary insulating walls 24, 34, and 44 to seal the inside and outside of the storage tank doubly.

The LNG storage tank 10 configured as described above includes a corner structure 20 installed at an inner corner portion, an anchor structure 30 installed at regular intervals on a bottom surface, and a planar structure 40 disposed between the corner structure 20 and the anchor structure 30 or between the anchor structure 30 and the anchor structure 30 and slidably movable. Here, the corner structure 20, the anchor structure 30, and the planar structure 40 may be prefabricated as respective unit modules and then assembled to the storage tank 10, and the primary sealing wall 50 may be installed thereon to fluid-tightly sealing the insulating wall, thereby providing a space in which the LNG may be stored therein.

As shown in FIG. 1, the corner structure 20, the anchor structure 30, and the planar structure 40 may include primary insulating walls 24, 34, and 44, secondary insulating walls 22, 32, and 42, and secondary sealing walls 23, 33, and 43.

Meanwhile, in each of the structures 20, 30, and 40, a secondary sealing wall of each unit module and a contact surface of each insulating wall may be bonded to each other by an adhesive to be integrally formed. Typically, the secondary insulating walls 22, 32, and 42 include polyurethane foam, which is an insulation material, and a plate material adhered to a lower portion thereof. And, the primary insulating walls 24, 34, 44 are formed of polyurethane foam and a plate material adhered thereto by an adhesive. In addition, the primary sealing wall is installed on top of the primary insulating walls 24, 34, 44 and fixed to the anchor structure 30 by welding.

In addition, a flange 42a larger than the secondary insulating wall 42 is formed at a lower end of the secondary insulating wall 42 of the planar structure 40. The flange 42a is inserted into a recess formed at a lower end of the anchor structure 30 and is installed to be slidably movable.

In the illustrated example, each anchor structure 30 has an anchor support rod 36, a fixing member 37 located at a lower portion, an anchor secondary insulating wall 32, and an anchor primary insulating wall 34, and a secondary sealing wall 33 is connected between the anchor secondary insulating wall 32 and the anchor primary insulating wall 34. One end of the anchor support rod 36 is connected to the primary sealing wall 50 and the other end thereof is connected to a hull inner wall 12 by the fixing member 37.

Meanwhile, in the anchor structure 30, the primary sealing wall 50 is welded and coupled to the upper end of the anchor support rod 36.

In addition, the anchor structure 30 is located at a connection point of adjacent planar structures 40 to connect them, and the planar structure 40 is fixed to the hull inner wall 12 or the bulkhead 14 forming the storage tank 10. In addition, the fixing member 37 of the anchor structure 30 is installed around the anchor support rod 36.

However, in the related art LNG storage tank, a configuration of the insulating wall structure includes primary and secondary insulating walls and a secondary sealing wall interposed therebetween, which is complicated. In addition, the structure for connecting the secondary sealing walls of each unit module to each other is complicated, and connection work is not easy. In addition, since the structure and installation work of a connection portion of an anchor portion or the secondary sealing wall are difficult, reliability of LNG sealing to the secondary sealing wall may be lowered, to cause leakage of LNG.

In addition, the related art corner structure 20, in which only a load of LNG applied to the sealing wall 50 is supported and the sealing wall 50 is not attached, there may be room for improvement in absorbing stress occurring during deformation of the hull or thermal deformation of the storage tank due to loading and unloading of LNG in a cryogenic state.

In recent years, as engine performance has improved, the consumption of boil-off gas has decreased, and demand for a lower boiler-off rate (BOR) has gradually increased. To this end, an increase in thickness of an insulating structure to increase the insulation performance may increase a weight and an increase in the amount of shrinkage of the insulating structure for sloshing impact, causing a problem in that a relative displacement between the sealing wall and the anchor structure further increases. For this reason, the reliability of LNG sealing in the sealing wall may be lowered to cause LNG leakage.

Therefore, it is necessary to continuously make efforts to improve work efficiency and reduce construction period and costs when manufacturing a storage tank by reducing the weight of each unit module, while maintaining the insulation performance of the insulating structure.

DISCLOSURE

Technical Problem

The present disclosure provides a corner structure of a liquefied gas storage tank having an improved structure, capable of simplifying a structure of an insulating wall and a sealing wall and a coupling structure thereof in the liquefied gas storage tank, improving work to be easy, increasing reliability of sealing, shortening a dry time of the tank by simplifying an assembly structure and a manufacturing process, and allowing a corner portion to more efficiently resolve mechanical stress occurring in the storage tank.

Technical Solution

According to an embodiment of the present disclosure, a corner structure of a liquefied gas storage tank installed at a corner of a storage tank for loading liquefied gas and supporting a sealing wall preventing leakage of liquefied gas, includes: two insulating members disposed on an inner surface of a hull structure wall to be oriented in different directions; and a movable member installed on each of the insulating members and to which the sealing wall is attached, wherein the movable member is coupled to be slidably displaced with respect to the insulating member.

The insulating member may include a lower plate, a middle plate, and an upper plate having a flat plate shape; a lower heat insulator interposed between the lower plate and the middle plate; and an upper insulator interposed between the middle plate and the upper plate, wherein the upper insulator and the lower insulator are formed of an insulator of the same material.

The lower insulator may have a density lower than a density of the upper insulator.

The insulating member may include one or more reinforcing plates connecting the lower plate and the middle plate in the lower insulator to reinforce the lower insulator.

The reinforcing plates may be arranged parallel to each other within the lower insulator, a mastic is interposed between the insulating member and the hull structure wall, and the mastic is located on a straight line with the reinforcing plate.

The sealing wall may include a primary membrane and a secondary membrane, the movable member includes a primary joint portion to which the primary membrane is attached, a secondary joint portion formed to have a step difference from the primary joint portion, to which the secondary membrane is attached, and a flange portion extending from the secondary joint portion for coupling with the insulating member, wherein the flange portion is slidably interposed between upper plates of the insulating member formed of two sheets of plywood, so that the insulating member and the movable member may be combined to be relatively slidably displaceable.

The secondary joint portion and the flange portion may be formed by bending a sheet of metal, and the primary joint portion is formed by adhering a metal rod having a rectangular cross-section to the secondary joint portion.

The corner structure of the liquefied gas storage tank may further include a middle insulator disposed in a space surrounded by two insulating members oriented in different directions and the hull structure wall.

The corner structure of the liquefied gas storage tank may further include: a curved member disposed between upper plates of the two insulating members to support the sealing wall and having a curved surface facing an inside of the storage tank.

The insulating member may include two upper plates, the movable member includes a joint portion to which the sealing wall is bonded and a flange portion extending from the joint portion, among the two upper plates, a first upper plate located on a lower side may include a concave portion in which the flange portion is seated, and a second upper plate located above the first upper plate may include an opening through which the joint portion passes, and the flange portion may be interposed between the first upper plate and the second upper plate in the concave portion.

A length and width of the concave portion may be greater than a length and width of the flange portion, and a length and width of the opening portion are greater than a length and width of the joint portion.

According to an embodiment of the present disclosure, there is provided a liquefied gas storage tank including a corner structure installed at a corner to support a sealing wall preventing leakage of liquefied gas, wherein the corner structure includes: two insulating members disposed on an inner surface of a hull structure wall to be oriented in different directions; and a movable member installed on each of the insulating members and to which the sealing wall is attached, wherein the movable member is coupled to be slidably displaced with respect to the insulating member.

A planar structure may be disposed around the corner structure, the planar structure may include a secondary insulating panel installed on the hull structure wall and a primary insulating panel adhered to the secondary insulating panel to be adjacent to the sealing wall, the primary insulator included in the primary insulating panel and the secondary insulator included in the secondary insulating panel may be formed of an insulator of the same material, the secondary insulator has a density lower than a density of the primary insulator, and the secondary insulating panel may include one or more secondary reinforcing plates for reinforcing the secondary insulator in the secondary insulator.

The sealing wall may include a primary membrane in direct contact with liquefied gas and a secondary membrane installed to be spaced apart from the primary membrane by a predetermined distance, and a support plate may be interposed between the primary membrane and the secondary membrane to maintain a constant interval therebetween.

Advantageous Effects

As described above, according to the present disclosure, a corner structure of a liquefied gas storage tank having an improved structure, capable of simplifying a structure of an insulating wall and a sealing wall and a coupling structure thereof in the liquefied gas storage tank, improving work to be easy, increasing reliability of sealing, shortening a dry time of the tank by simplifying an assembly structure and a manufacturing process, and allowing a corner portion to more efficiently resolve mechanical stress occurring in the storage tank may be provided.

BEST MODE

Hereinafter, configuration and operation according to an embodiment of the present disclosure will be described in detail with reference to the drawings. In addition, the following embodiments may be modified into various other forms, and the scope of the present disclosure is not limited to the following embodiments.

In this specification, the expressions 'upper portion' and 'lower portion' are based on each corner structure or planar structure before being adhered to a structure wall of a hull to form a storage tank and are not based on the entire storage tank. Each corner structure or planar structure may be adhered not only to the bottom of the storage tank, but also to a ceiling and side walls. For example, when each corner structure or planar structure is adhered to the bottom of the storage tank, the 'upper portion' and 'lower portion' in each corner structure or planar structure have the same orientation as 'upper portion' and 'lower portion' in the entire storage tank, but when each corner structure or planar structure is adhered to the ceiling or side surface of the storage tank, the 'upper portion and the 'lower portion' of each corner structure or planar structure have different orientations from the 'upper portion and 'lower portion' of the entire storage tank.

Figure 1:
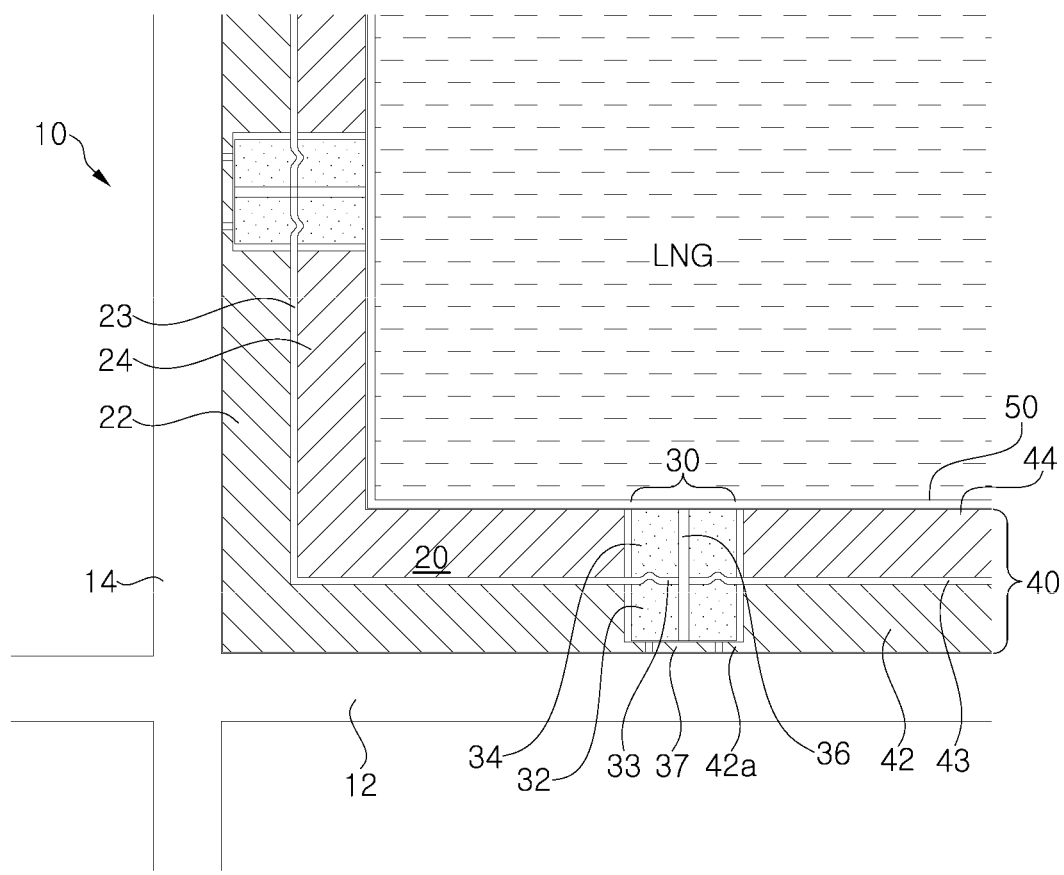
FIG. 1 is a cross-sectional view illustrating a portion of a storage tank for LNG according to the related art.

A liquefied gas storage tank formed by a corner structure 100 and a planar structure 300 according to an embodiment of the present disclosure includes an insulating wall and a sealing wall laminated the structure wall (hull; 12, 14) of a hull, like the storage tank described above with reference to FIG. 1. However, compared to the related art storage tank shown in FIG. 1 in which a secondary insulating wall, a secondary sealing wall, a primary insulating wall, and a primary sealing wall are sequentially alternately laminated, in the storage tank including the corner structure 100 and the planar structure 300 according to an embodiment of the present disclosure, a sealing wall is installed on an insulating wall and the sealing wall is not interposed between insulating walls. The insulating wall may be formed by arranging a plurality of modularized insulating structures (e.g., the corner structure 100, the planar structure 300, etc.) on the structure walls 12 and 14 of the hull.

Figure 2:
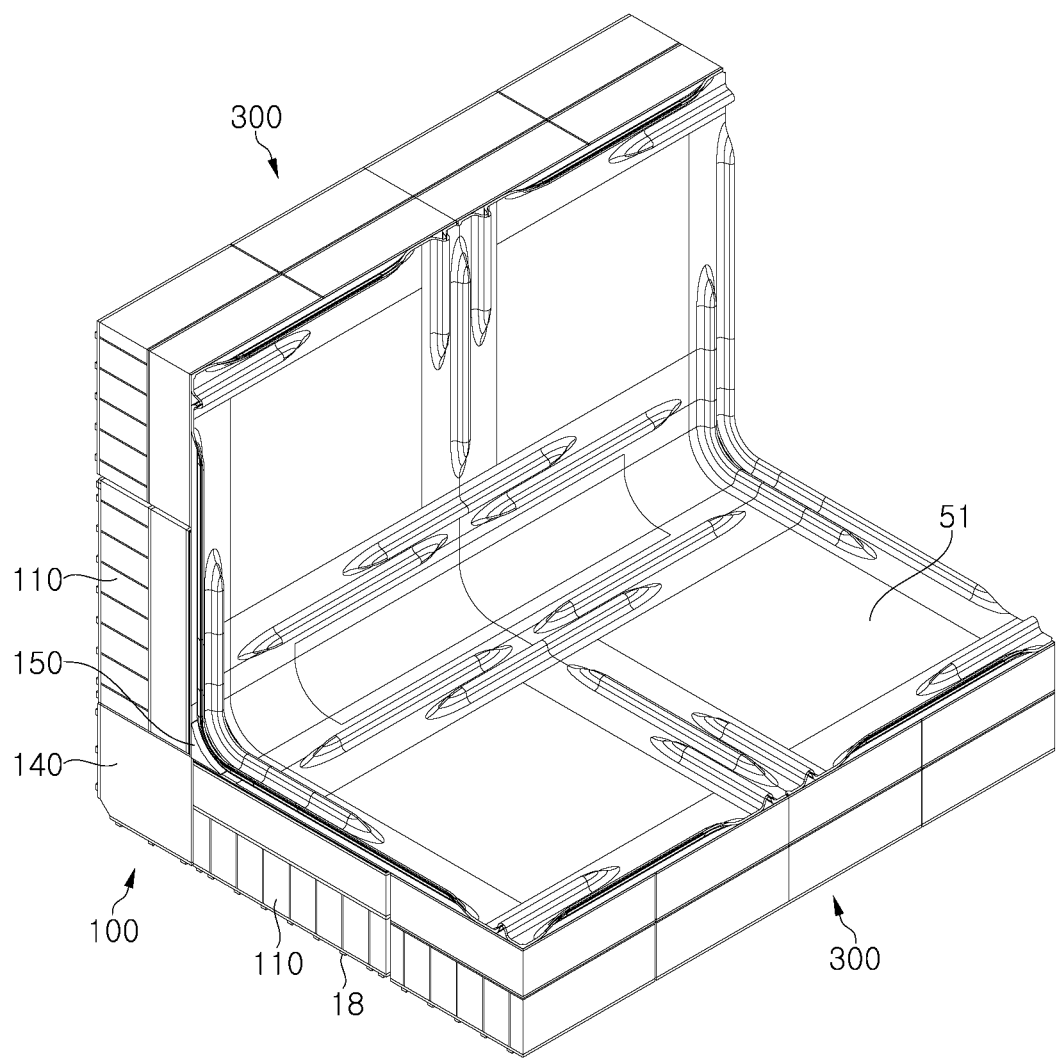
FIG. 2 is a perspective view of a corner structure according to an embodiment of the present disclosure, illustrating primary and secondary membranes and a portion of a planar structure together.
Figure 3:
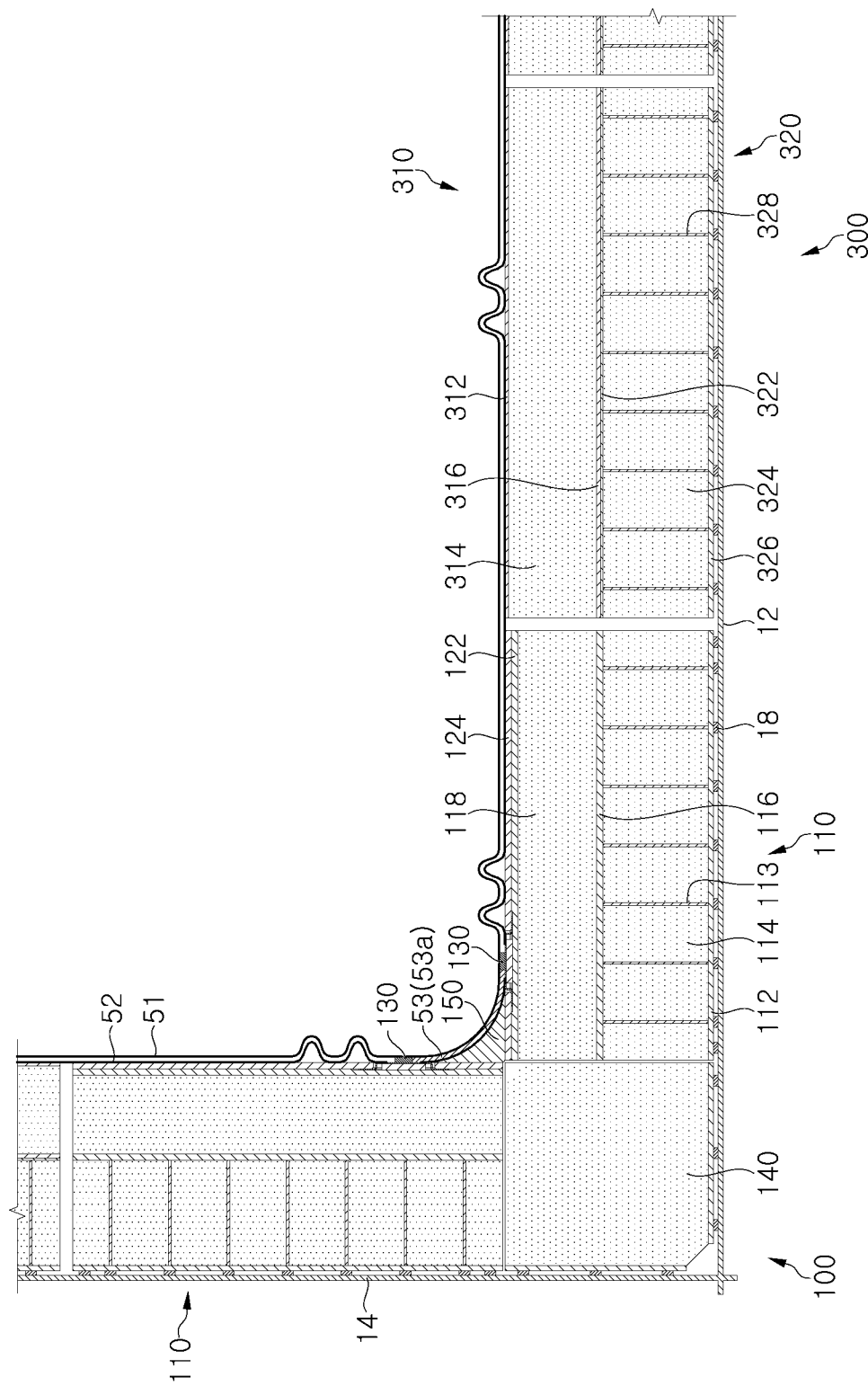
FIG. 3 is a cross-sectional view taken along plane A-A plane.

FIG. 2 is a perspective view of a corner structure according to an embodiment of the present disclosure, and FIG. 3 is a cross-sectional view taken along plane A-A of FIG. 2. FIG. 2 illustrates the corner structure 100 according to an embodiment of the present disclosure together with primary and secondary membranes 51 and 52 and a portion of a planar structure 300. The shapes of the first and secondary membranes 51 and 52 and the shape of the planar structure 300 are not limited to those illustrated.

As shown in FIGS. 2 and 3, the corner structure 100 according to an embodiment of the present disclosure includes an insulating member 110 disposed on a surface of a wall body partitioning an internal space of the hull so that the storage tank 10 (refer to FIG. 1) may be installed, that is, a hull structure wall, such as an inner wall 12 (refer to FIG. 1) or the blockhead 14 (refer to FIG. 1), and a movable member 130 supported on the insulating member 110 and to which membranes 51 and 51 for sealing are attached.

Here, the movable member 130, as will be described later, is installed to be finely displaceable with respect to the insulating member 110 when thermal deformation resulting from a change in temperature according to loading or unloading of liquefied natural gas (LNG) in a cryogenic state or deformation of the hull due to waves occurs. That is, the movable member 130 and the insulating member 110 are configured to be relatively displaceable with respect to each other.

According to an embodiment of the present disclosure, the insulating member 110 has a coupling structure with the movable member 130, but may be configured not to have a coupling structure with the hull structure walls 12 and 14. As will be described later, the insulating member 110 is only placed on the hull structure walls 12 and 14 with a mastic 18 interposed therebetween, and may not be coupled by a separate mechanical coupling structure.

Each insulating member 110 may be formed of, for example, a polyurethane foam insulator and plywood. However, the present disclosure is not limited by the material and structure of the insulating member 110 included in the corner structure 100.

The insulating member 110 may include a lower plate 112, a lower insulator 114, a middle plate 116, an upper insulator 118, and upper plates 122 and 124. The lower plate 112 and the middle plate 116 may be formed of one sheet of plywood, and the upper plates 122 and 124 may be formed of two sheets of plywood.

The upper insulator 118 and the lower insulator 114 may be formed of the same material, for example, polyurethane foam (PUF), and the lower insulator 114 may be foam-molded to have a density value equal to or lower than that of the upper insulator 118. For example, the upper insulator 118 may be formed of PUF having a density of 80 to 240 kg/m 3, and the lower insulator 114 may be formed of PUF having a density of 40 to 240 kg/m 3 The upper insulator 118, located relatively close to the cryogenic liquefied gas, is manufactured to have a relatively high density to improve insulation performance, and the lower insulator 114, located relatively far from the cryogenic liquefied gas (located closer to the hull structure wall side), is manufactured to have a relatively low density to reduce a weight of the insulating member 110. Therefore, it is possible to simultaneously achieve BOR improvement and weight reduction of the storage tank.

In addition, the insulating member 110 may include one or more reinforcing plates 113 connecting the lower plate 112 and the middle plate 116 to reinforce the lower insulator 114 manufactured to have a relatively low density. The reinforcing plate 113 may be formed of plywood. When a plurality of reinforcing plates 113 are installed in the lower insulator 114, the plurality of reinforcing plates 113 may be arranged in parallel with each other. Although seven reinforcing plates 113 are shown in FIG. 3, the number of installed reinforcing plates may vary depending on a size of the insulating member 110 or a density of the lower insulator 114. As the lower heat insulator 114, a polyurethane foam mass formed by foam-molding may be used by cutting it to a predetermined size, that is, to a size of a space between the reinforcing plates 113.

A protective layer (not shown) formed of glass wool may be laminated on a side surface of the insulating member 110 to protect the upper insulator 118 and the lower insulator 114.

In the above, in order to reinforce the lower insulator 114 of the insulating member 110, the use of reinforcing plates 113 arranged in parallel has been illustrated, but variations may be made such that an insulating box formed of plywood is used or the reinforcing plates are arranged in a grid form, etc. In addition, the insulating member 110 may be deformed so that the reinforcing plate for reinforcing the lower insulator 114 is not used. In addition, the insulating member 110 may be formed of a single layer of insulator, similar to the middle insulator 140 described below, instead of having a two-layer structure of an upper insulator and a lower insulator.

The mastic 18 may be interposed between the insulating member 110 and the hull structure walls 12 and 14. The mastic 18, which is an adhesive of epoxy material, may be applied to be located on a straight line with the reinforcing plate 113, as shown in FIG. 3. According to the corner structure 100 of the present embodiment, only the mastic 18 may be interposed between the insulating member 110 and the hull structure walls 12 and 14, and a fixing structure for fixing the insulating member 110 of the corner structure 100 to the hull structure walls 12 and 14, for example, mechanical fixing members, such as stud bolts and nuts, may not be provided.

The movable member 130 includes a primary joint portion 132 to which the primary membrane 51 is attached, a secondary joint portion 134 formed to have a step difference from the primary joint portion 132 and to which the secondary membrane 52 is attached, and a flange portion 136 extending from the secondary joint portion 134 for coupling with the insulating member 110. The flange portion 136 of the movable member 130 is slidably interposed between the upper plates 122 and 124 of the insulating member 110 formed of two plywoods, so that the insulating member 110 and the movable member 130 are connected.

For example, the secondary joint portion 134 and the flange portion 136 may be formed by bending a sheet of metal (for example, SUS having a thickness of 3 t), and the primary joint portion 132 may be formed by adhering a metal rod having a rectangular cross-section (for example, SUS having a thickness of 13 t) on the secondary joint portion 134.

As described above, the sealing membrane includes the primary membrane 51 forming a primary sealing wall, while directly contacting liquefied gas, and the secondary membrane 52 forming a secondary sealing wall. Each of the primary joint portion 132 and the secondary joint portion 134 may be provided in the movable member 130 so that the primary membrane 51 and the secondary membrane 52 may be joined at regular intervals, for example, by welding. A difference in height between the primary joint portion 132 and the secondary joint portion 134 may be set equal to a gap formed between the primary membrane 51 and the secondary membrane 52.

A support plate 53 may be interposed between the primary membrane 51 and the secondary membrane 52 to maintain a gap and support a load from cargo. The support plate 53 may be formed of plywood, for example.

In order for the corner structure 100 shown in FIGS. 2 and 3 to be installed in a corner portion at which two wall surfaces among a plurality of wall surfaces forming the storage tank are connected at an angle of 90 degrees, two insulating members 110 are arranged to be oriented at an angle of 90 degrees. When two of the plurality of wall surfaces forming the storage tank are connected at an angle (e.g., 30 degrees, 45 degrees, 60 degrees, etc.) other than 90 degrees, the insulating member may be oriented according to the angles. In the following description and drawings, a 90-degree corner structure is described as an example, but this is only an example and the present disclosure is not limited by the angle formed by the corner structure.

A space demarcated by the two insulating members 110 oriented in different directions and the hull structure walls 12 and 14 may be filled with the middle insulator 140 having a shape corresponding to the space. In FIGS. 2 and 3, a cross-sectional shape of the middle insulator 140 is approximately square, but the shape of the middle insulator may vary according to the angle formed by the two insulating members 110. The middle insulator 140 may be formed of PUF having a density of 40 to 240 kg/m 3, for example.

A gap between the insulating member 110 and the middle insulator 140 may be filled with an insulator, such as glass wool. Glass wool may have a density less than 90 kg/m 3, for example. Glass wool may have a density of 20 to 50 kg/m 3, for example.

Figure 4:
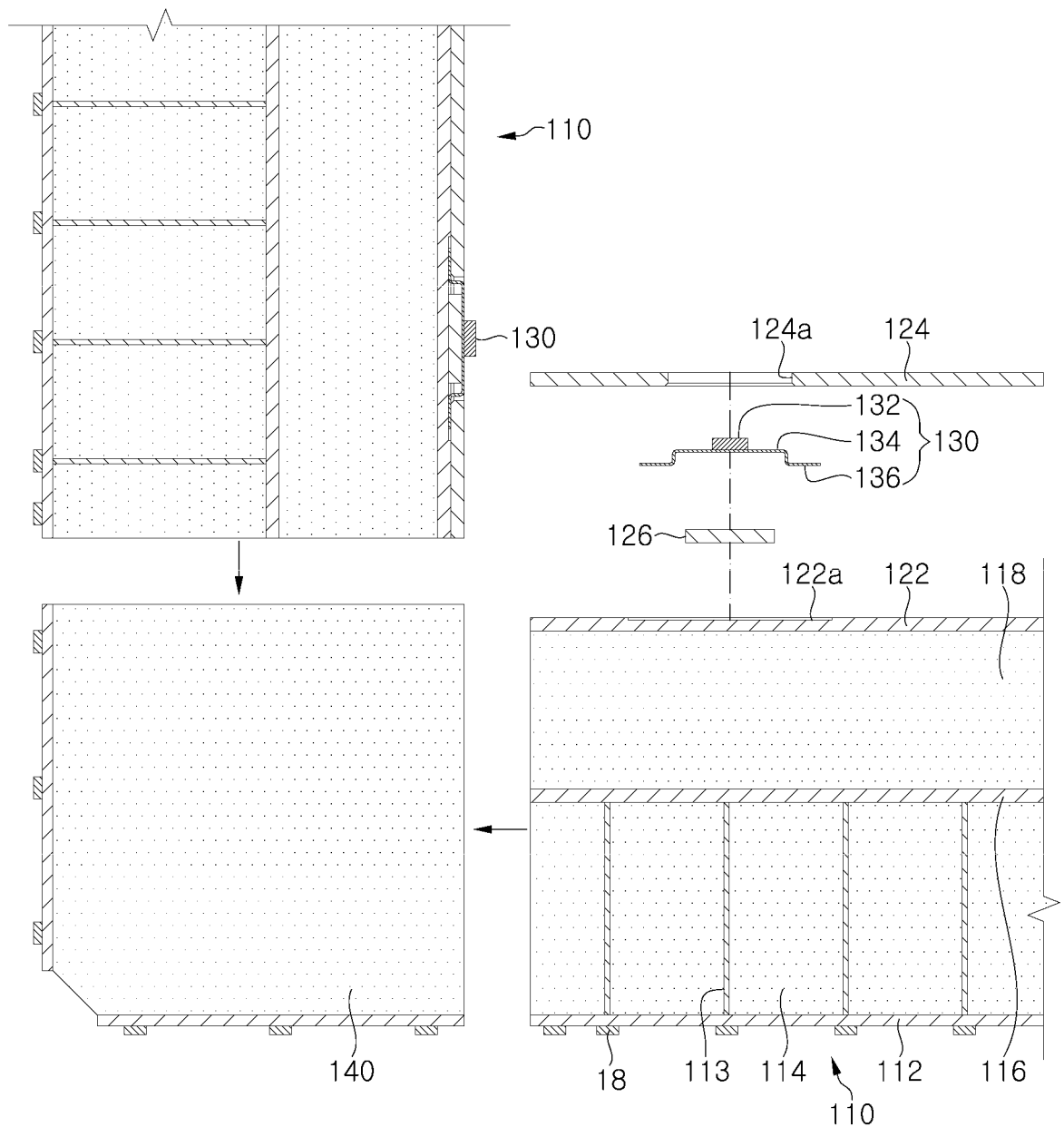
FIGS. 4 to 8 are cross-sectional views illustrating an assembly process of a corner structure according to an embodiment of the present disclosure.

A corner portion of the middle insulator 140, that is, the corner portion (an upper right corner portion of the middle insulator 140 in FIG. 4) of a portion in which the two insulating members 110 are adjacent may be chamfered to prevent damage.

The insulating member may have a modified structure to be fixed on the hull structure wall in a mechanical manner, for example, by using stud bolts and nuts. In addition, the insulating member may have a modified structure so as to be fixed by the adjacent planar structure 300.

The corner structure 100 according to an embodiment of the present disclosure may further include a curved member 150 having a curved surface facing the inside of the tank. The curved member 150 may be formed of, for example, PLW or high-density polyurethane foam (for example, PUF of 80 to 240 kg/m 3). Alternatively, the curved member 150 may be formed of, for example, an organic insulator having a cell structure. The curved member 150 is disposed between the upper plates 122 and 124 of the two insulating members 110 to support the membranes 51 and 52.

Figure 7:
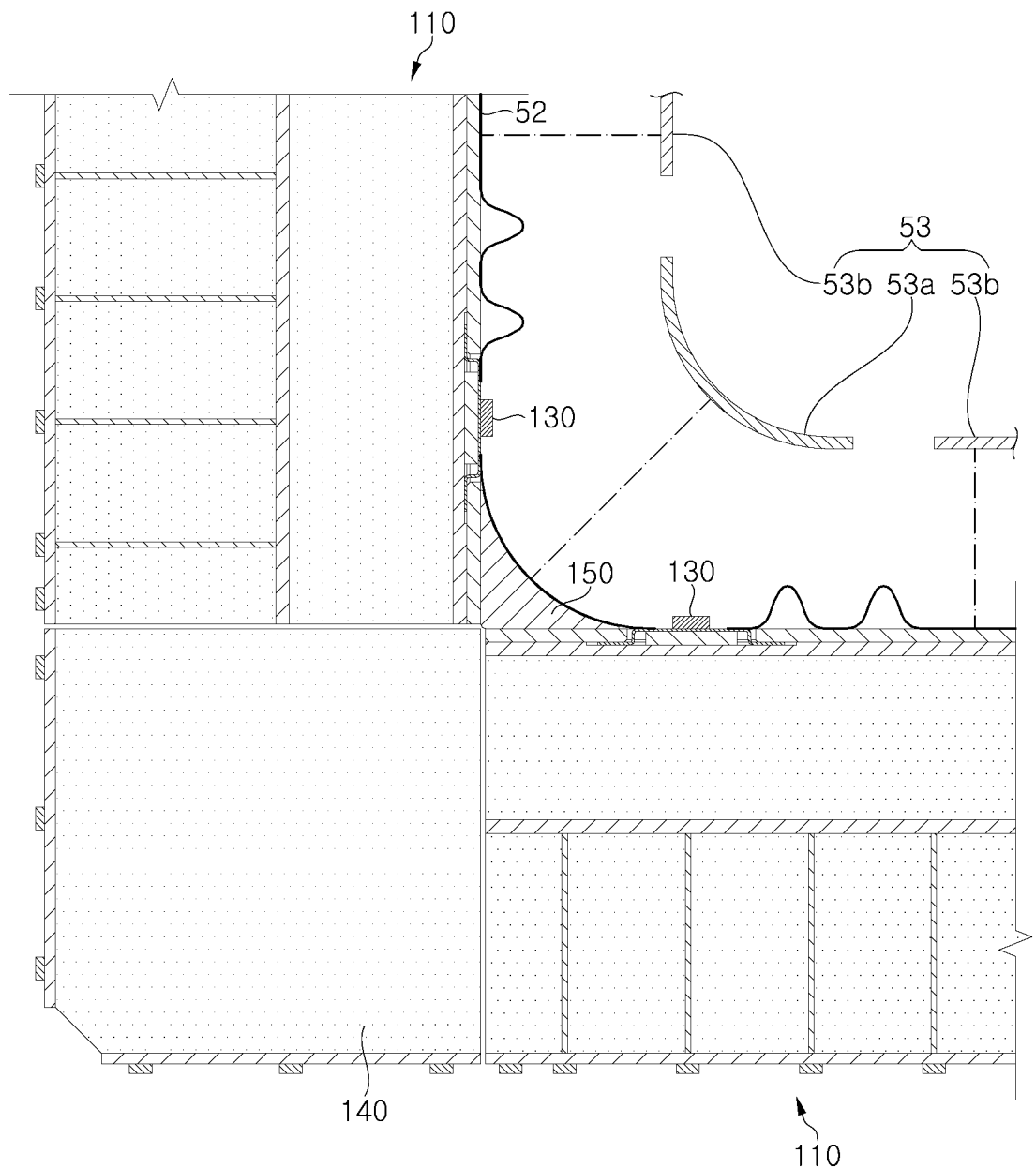
Figure 8:
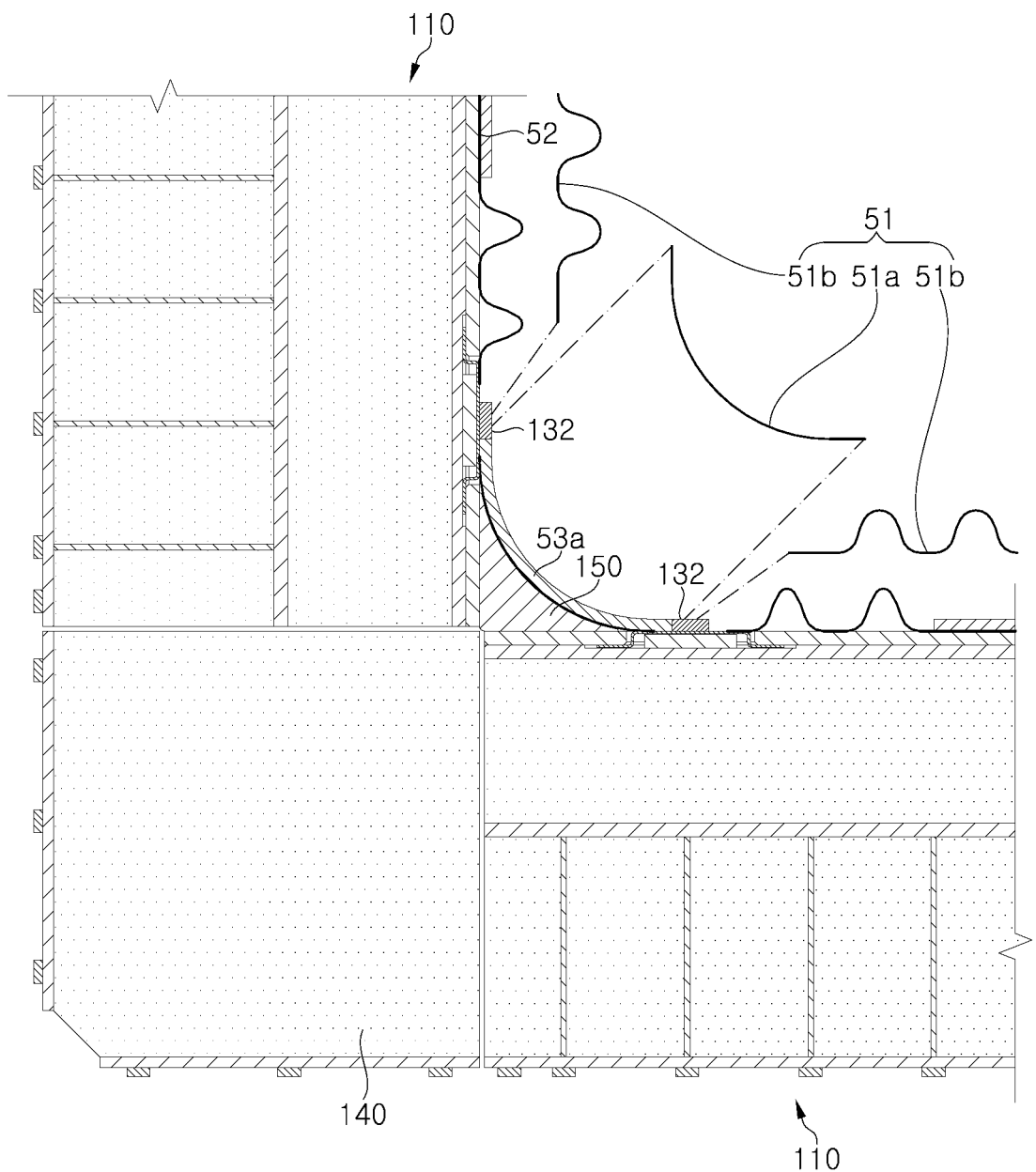
Figure 9:
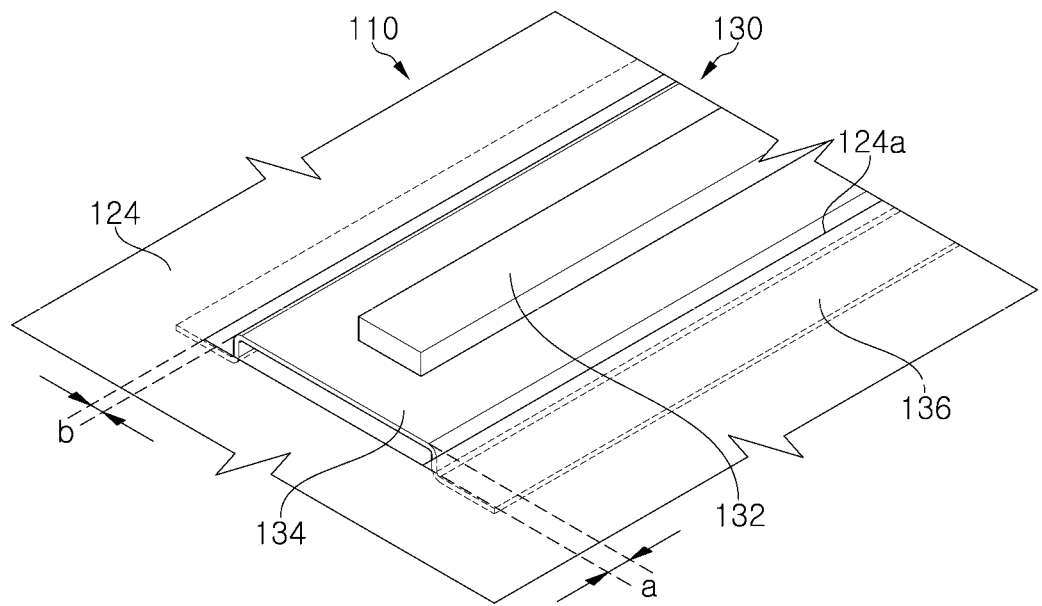
FIG. 9 is a partially enlarged plan view of a corner structure according to an embodiment of the present invention.
Figure 10:
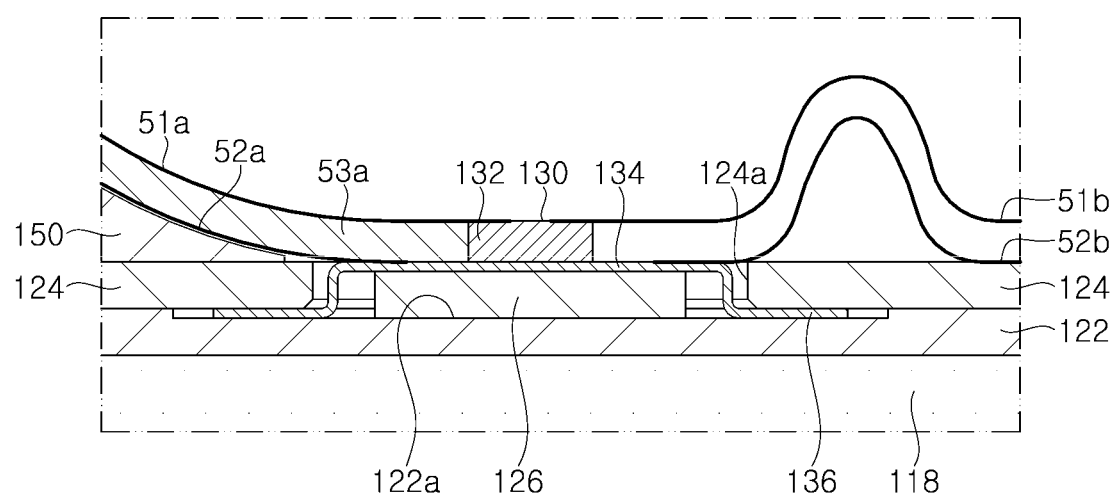
FIG. 10 is a cross-sectional view of main portions illustrating a state in which primary and secondary membranes are bonded to a corner structure according to an embodiment of the present invention.

FIGS. 4 to 8 are cross-sectional views illustrating an assembly process of a corner structure according to an embodiment of the present disclosure, FIG. 9 is a partially enlarged plan view illustrating a partially enlarged upper plate of the movable plate of the corner structure and the insulating member, and FIG. 10 is a cross-sectional view of a main portion of the corner structure to which the primary and secondary membranes are attached.

The corner structure 100 according to an embodiment of the present disclosure may be manufactured as a single module by integrally adhering the movable member 130 to the insulating member 110. The insulating member 110 to which the movable member 130 is adhered may be manufactured at a site where a vessel having a storage tank is built or may be manufactured as a module in a nearby or remote factory and then transported to the site.

As shown in FIGS. 4 and 10, the movable member 130 may be slidably coupled to the upper plates 122 and 124 of the insulating member 110. Specifically, among the two upper plates of the insulating member 110, the first upper plate 122 (plywood of 15*t*) has a concave portion 122*a* in which the flange portion 136 of the movable member 130 may be seated, and an opening 124*a* into which the secondary joint portion 134 of the movable member 130 may be inserted is formed in the second upper plate 124 (plywood of 15*t*).

A length and width of the concave portion 122*a* are larger than a length and width of the movable member 130. A length and width of the opening 124*a* are greater than a length and width of the secondary joint portion 134 of the movable member 130. As shown in FIG. 9, gaps a and b are formed between the opening 124*a* and the secondary joint portion 134 of the movable member 130. Further, as shown in FIG. 10, a gap is also formed between a side wall surface of the concave portion 122*a* and the flange portion 136 of the movable member 130.

Therefore, by sequentially stacking the first upper plate 122, the movable member 130 and the second upper plate 124 and fixing the first upper plate 122 to the second upper plate 124, the movable member 130 may be slidably interposed between the first upper plate 122 and the second upper plate 124.

A spacer 126 may be disposed between the secondary joint portion 134 of the movable member 130 and a bottom surface of the concave portion 122*a* of the first upper plate 122. The spacer 126 may be integrally formed with the first upper plate 122 or may be formed as a separate member. A gap is also formed between the spacer and the flange portion 136.

Figure 5:
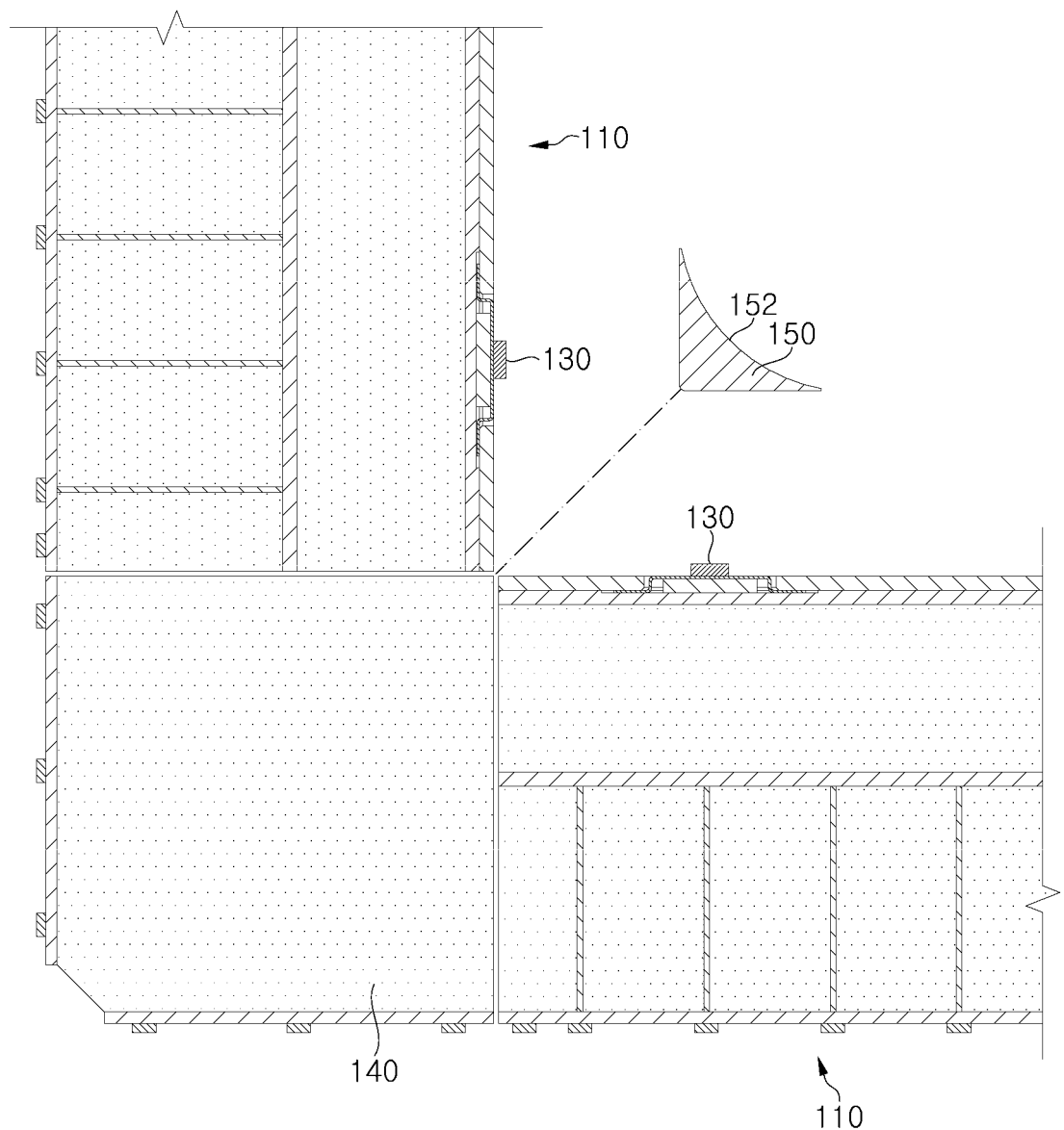

As shown in FIG. 5, the curved member 150 is located between the two insulating members 110. Both edges of the curved portion 152 of the curved member 150 are close to the movable member 130 but do not contact the movable member 130.

Figure 6:
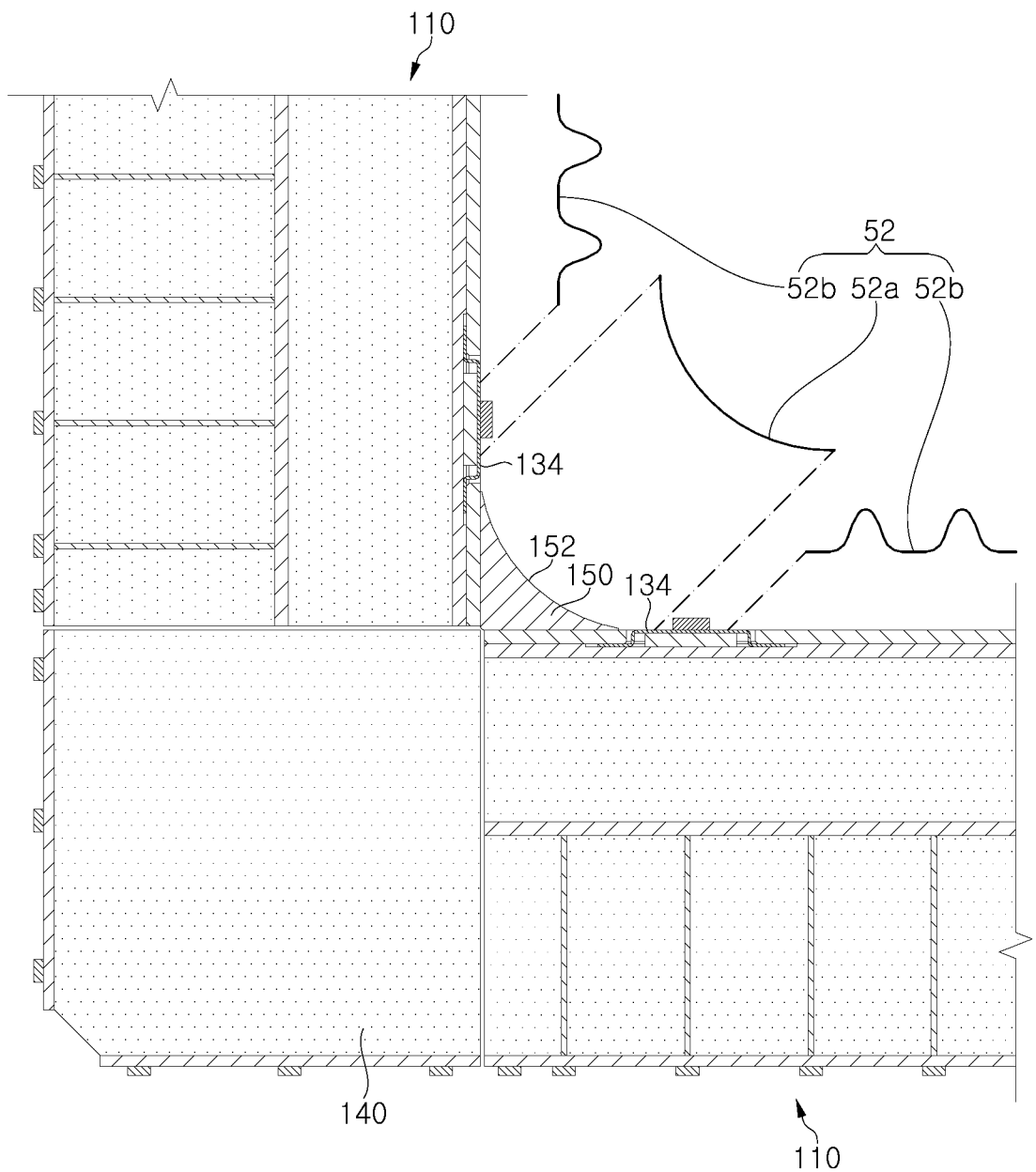

As illustrated in FIGS. 6 to 8, the secondary membrane 52, the support plate 53, and the primary membrane 51 may be sequentially stacked on the corner structure 100 according to an embodiment of the present disclosure.

The secondary membrane 52 is bonded to the secondary joint portion 134 of the movable member 130. The secondary membrane 52 may include, for example, a secondary curved portion 52*a* that is bent at 90 degrees and a secondary flat portion 52*b* formed to have a flat plate shape. The secondary curved portion 52*a* extends between two movable members 130, and a cross-section thereof has a substantially circular arc-shape and curved to be rounded so that the secondary curved portion 52*a* may be seated on the curved portion 152 of the curved member 150. The secondary flat portion 52*b* may have wrinkles to respond to thermal deformation of the membrane.

The support plate 53 is laminated on the secondary membrane 52. Like the secondary membrane, the support plate 53 may include, for example, a curved portion support plate 53*a* that is bent at 90 degrees and a flat support plate 53*b* formed to have a flat plate shape. The secondary curved portion 52*a* extends between two movable members 130, and a cross-section thereof has a substantially circular arc-shape and curved to be rounded so that the secondary curved portion 52*a* may be seated on the curved portion 152 of the curved member 150.

The primary membrane 51 is bonded to the primary joint portion 132 of the movable member 130. Like the secondary membrane, the primary membrane 51 may include, for example, a primary curved portion 51*a*, which is a portion bent at 90 degrees, and the secondary flat portion 52*b* formed to have a flat plate shape. The primary curved portion 51*a* extends between two movable members 130, and a cross-section thereof has a substantially circular arc-shape and curved to be rounded so that the primary curved portion 51*a* may be seated on the curved portion support plate 53*a*. The primary flat portion 51*b* may have wrinkles to respond to thermal deformation of the membrane.

The support plate 53 may be interposed over the entire portion, except for a portion in which the primary and secondary membranes 51 and 52 are arranged to be parallel to each other, that is, the portion in which the wrinkles are formed, but may also be interposed partially over the remaining portion except for the portion in which wrinkles are formed.

As the support plate 53, plywood having a certain thickness may be used alone, polyurethane foam (or reinforced polyurethane foam) having a certain thickness may be used alone, or polyurethane foam (or reinforced polyurethane foam) to which plywood is adhered may be used.

As described above, when loading and unloading cargo or when an external force is generated at sea, relative displacement may occur between the movable member 130 and the insulating member 110 relative to each other due to deformation of the hull or membrane. As shown in FIGS. 9 and 10, since a size of the concave portion 122*a* formed in the first upper plate 122 of the insulating member 110 is larger than a size of the flange portion 136 of the movable member 130 and a size of the opening 124a formed in the second upper plate 124 of the insulating member 110 is larger than a size of the secondary joint portion 134 of the movable member 130, even if displacement occurs, the displacement may be absorbed.

In addition, when the membranes 51 and 52 shrink due to thermal deformation generated during shipment of liquefied gas, the movable member 130 to which the membranes 51 and 52 are bonded may also shrink together. At this time, both ends of the movable member 130 may be displaced while sliding finely toward the central portion of the movable member. As described above, since the flange portion 136 of the movable member 130 is slidably interposed between the first upper plate 122 and the second upper plate 124, the coupling state of the movable member 130 to the insulating member 110 may be maintained continuously even when the movable member 130 contracts and expands.

As described above, the storage tank 10 is sealed in a liquid-tight state by the first and secondary membranes 51 and 52. That is, the storage tank 10 forms one storage space surrounded by a two-ply sealing wall by integrally connecting a plurality of metal plates to each other by welding, and accordingly, the storage tank 10 may store and transport liquefied gas without leakage.

As is well known, the primary membrane 51 in direct contact with liquefied gas, such as LNG in a cryogenic state, and the secondary membrane 52 installed to be spaced apart from the primary membrane 51 have wrinkles formed to respond to changes in temperature according to loading and unloading of the liquefied gas.

These primary and secondary membranes 51 and 52 may be indirectly connected to the hull structure walls 12 and 14 of the vessel through a plurality of corner structures 100 and anchor structures (not shown).

Referring back to FIGS. 2 and 3, the planar structure 300 may be arranged around the corner structure 100. Compared to the insulation member 110 of the corner structure 100 described above, the planar structure 300 is different in that it has a structure in which a primary insulating panel 310 and a secondary insulating panel 320 are stacked.

As shown in FIGS. 2 and 3, the planar structure 300 according to an embodiment of the present disclosure for forming an insulating wall may include a primary insulating panel 310 and a secondary insulating panel 320, and the primary insulating panel 310 and the secondary insulating panel 320 may be bonded to each other by, for example, PU bonding to be integrated.

The primary insulating panel 310 and the secondary insulating panel 320 of the planar structure 300 may be formed of, for example, an insulation material of polyurethane foam and plywood. More specifically, the primary insulating panel 310 of the planar structure 300 located closer to the sealing wall may include, for example, a primary insulator 314 formed of polyurethane foam, etc., and a primary upper plate 312 and a primary lower plate 316 bonded to the upper and lower surfaces of the primary insulator 314, respectively. Adhesion between the primary insulator 314 and the primary upper and lower plates 312 and 316 may be achieved by, for example, PU bonding.

In addition, the secondary insulating panel 320 of the planar structure 300 located to be closer to the hull structure wall may include, for example, a secondary insulator 324 formed of polyurethane foam or the like and a secondary upper plate 322 and a secondary lower plate 326 laminated on upper and lower surfaces of the secondary insulator 324.

A plurality of secondary reinforcing plates 328 may be disposed between the secondary upper plate 322 and the secondary lower plate 326 to reinforce strength. The secondary reinforcing plate 328 connecting the secondary upper plate 322 and the secondary lower plate 326 may be made of plywood. When a plurality of secondary reinforcing plates 328 are installed in the secondary insulator 324, the plurality of secondary reinforcing plates 328 may be arranged in parallel with each other. FIG. 3 shows the planar structure 300 having ten secondary reinforcing plates 328, but the number of reinforcing plates being installed may vary depending on the size of the planar structure 300 or the density of the secondary insulator 324.

The secondary insulator 324 may fill the space between the plurality of secondary reinforcing plates 328. For example, the secondary insulator 324 may be cut to have a size suitable for each space and inserted thereinto.

The primary insulator 314 and the secondary insulator 324 may be formed of the same material, for example, polyurethane foam, and the primary insulator 314 and the secondary insulator 324 may be foam-molded so that the density of the secondary insulator 324 is lower than that of the primary insulator 314.

According to the present disclosure, by manufacturing the planar structure 300 to have a two-layer structure by bonding the primary insulating panel 310 and the secondary insulating panel 320, heat inflow from the outside to the inside of the storage tank may be better blocked, and by forming the secondary insulator 324 filled in the secondary insulating panel 320 to have a low density, both BOR improvement and weight reduction of the insulating structure may be achieved.

Furthermore, by reinforcing the secondary insulating panel 320 by a plurality of secondary reinforcing plates 328 disposed in parallel with each other, even if an insulator having a relatively low density is used for the secondary insulating panel 320, the strength of the secondary insulating panel 320 may be improved.

The planar structure 300 formed by bonding the primary insulating panel 310 and the secondary insulating panel 320 to each other is modularized and pre-manufactured in a factory in advance, and each modular unit planar structure is transported to the site and then mounted on the hull structure wall to manufacture a storage tank.

A protective layer (not shown) of a glass wool material for protecting the primary insulator 314 and the secondary insulator 324 may be laminated on the side surface of the planar structure 300. A space between the corner structure 100 and the planar structure 300 may be filled with an insulating material, such as glass wool, or the like.

In the above, in order to reinforce the secondary insulator 324 of the planar structure 300, the use of secondary reinforcing plates 328 arranged in parallel has been described, but modification may be made such that an insulation box formed of plywood may be used or reinforcing plates may be arranged in a grid form. In addition, the planar structure 300 may be deformed so that the reinforcing plate for reinforcing the secondary insulator 324 may not be used. In addition, the planar structure 300 may be formed of a single layer of insulator, similar to the aforementioned middle insulator 140, instead of having a two-layer structure of a primary insulator and a secondary insulator.

The mastic 18 may be interposed between the planar structure 300 and the hull structure walls 12 and 14. The mastic 18, which is an adhesive of epoxy material, may be applied so as to be located on a straight line with the secondary reinforcing plate 328, as shown in FIG. 3. The planar structure 300 according to the present embodiment may have a fixing structure for fixing the planar structure 300 to the hull structure walls 12 and 14, for example, mechanical fixing members (not shown), such as stud bolts and nuts.

An anchor unit (not shown) may be mounted at the center of the upper surface of the planar structure 300 to support the sealing wall. When the planar structure 300 includes an anchor unit, the planar structure having the anchor unit may function as an anchor structure. When manufacturing the liquefied gas storage tank, if necessary, the anchor structure and the planar structure may be properly arranged and mounted on the hull structure wall.

Like the insulating member 110 of the corner structure 100, the planar structure 300 may be modularized and pre-manufactured in a factory in advance, and each modular unit planar structure may be transported to the site, and then mounted on the hull structure wall for manufacturing a storage tank.

Each of the corner structure 100, anchor structure, and planar structure arranged in the storage tank 10 may be manufactured as one module in a separate location, and then transferred to the storage tank 10 and assembled. Due to modularization, workability may be improved when manufacturing a storage tank.

The primary and secondary membranes 51 and 52 are supported by corner structure 100 and anchor structure, and the planar structure only support a load of LNG applied to the primary and secondary membranes 51 and 52. In addition, it may be configured so that there is no direct coupling relationship between the planar structure and the corner structure 100 or between the planar structure and the anchor structure.

As described above, according to an embodiment of the present disclosure, the primary membrane 51 and the secondary membrane 52 are spaced apart from each other, and only the support plate 53 is interposed therebetween and an insulator is not interposed therebetween. Since most conventional insulation barrier structures have a primary insulating wall interposed between a primary sealing wall and a secondary sealing wall in direct contact with LNG, a complicated structure is required to support the primary sealing wall by the secondary sealing wall through the primary insulating wall. In contrast, the corner structure 100 according to the present disclosure is configured not to interpose an insulator performing a separate insulating function between the primary and secondary membranes 51 and 52, the primary and secondary membranes 51 and 52 may be relatively easily supported by the primary and secondary joint portions of the movable member 130.

In addition, according to the present disclosure, since the primary membrane 51 and the secondary membrane 52 are spaced apart from each other, even if the shape of the storage tank is deformed due to deformation of the hull due to external forces, such as waves, friction does not occur between the first and secondary membranes 51 and 52 and even if damage occurs due to an impact applied to one membrane, it is possible to prevent the damage from being directly propagated to the other membrane.

Meanwhile, although the sealing is described as having a double structure by the primary and secondary membranes 51 and 52, it is also possible to laminate three or more layers to form a multilayer structure.

In addition, according to the present disclosure, the movable member 130 to which the primary and secondary membranes 51 and 52 are bonded is finely slidably connected to the insulating member 110 as described above, so that the primary and secondary membranes 51 and 52 may be stably supported with respect to the hull. Accordingly, stress caused by thermal deformation due to loading and unloading of LNG or deformation of the hull due to external forces, such as waves, may be reliably absorbed.

Figure 11:
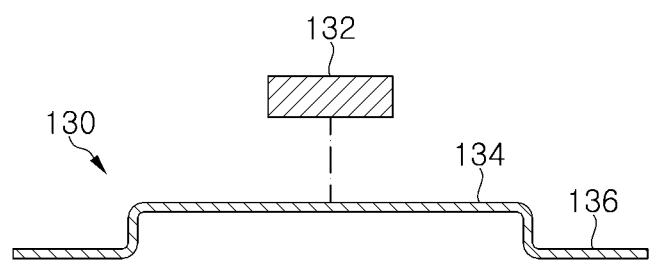
Figure 11:
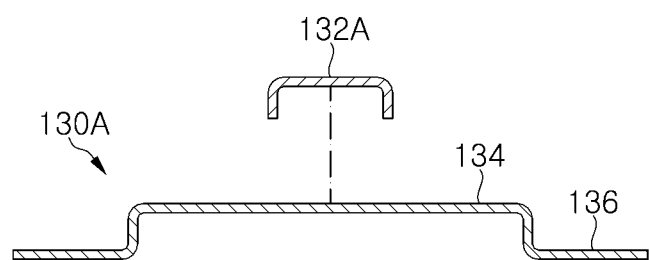

As shown in FIG. 11, the primary joint portion of the movable member 130 may be formed of a metal rod having a rectangular cross-section or a bent metal plate. (a) of FIG. 11 illustrates a cross-sectional view before assembly of the movable member 130 having the primary joint portion 132 formed of a metal rod, and (b) of FIG. 11 illustrates a cross-sectional view before assembly of a movable member 130A having a primary joint portion 132A formed of a bent metal plate.

The insulator, insulating member, or insulating material used in the above embodiment of the present disclosure may include, for example, glass wool, mineral wool, polyester filler, polyurethane foam, melanin foam, polyethylene foam, polypropylene foam, silicone foam, polyvinyl chloride foam, or the like.

Further, in the above embodiment of the present disclosure, it is described that the membrane is formed of, for example, corrugated stainless steel used in GTT Mark-III type, but the membrane may also be formed of, for example, Invar steel used in No. 96 of GTT.

In addition, of course, the present disclosure may be equally applied to liquefied gas storage tanks installed on land as well as liquefied gas storage tanks installed inside the hull of vessels.

The invention claimed is:

1. A corner structure of a liquefied gas storage tank installed at a corner of a storage tank for loading liquefied gas, the corner structure comprising:
   two insulating members disposed on an inner surface of a hull structure wall to be oriented in different directions;
   a sealing wall preventing leakage of liquefied gas; and
   a movable member installed on each of the insulating members and to which the sealing wall is attached,
   wherein the movable member is coupled to be slidably displaced with respect to each of the insulating members,
   the sealing wall includes a primary membrane and a secondary membrane,
   the movable member includes a primary joint portion to which the primary membrane is attached, a secondary joint portion formed to have a step difference from the primary joint portion, to which the secondary membrane is attached, and a flange portion extending from the secondary joint portion for coupling with each of the insulating members,
   the flange portion is slidably interposed between upper plates of each of the insulating members formed of two sheets of plywood, so that each of the insulating members and the movable member are combined to be relatively slidably displaceable, and
   the secondary joint portion and the flange portion are formed by bending a sheet of metal, and the primary joint portion is formed by adhering a metal rod having a rectangular cross-section or a U-shaped section steel formed by bending a sheet of metal to the secondary joint portion.

2. The corner structure of claim 1, wherein each of the insulating members includes a lower plate, a middle plate, and the upper plates having a flat plate shape; a lower insulator interposed between the lower plate and the middle plate; and an upper insulator interposed between the middle plate and the upper plates,
   wherein the upper insulator and the lower insulator are formed of an insulator of the same material.

3. The corner structure of claim 2, wherein the lower insulator has a density lower than a density of the upper insulator.

4. The corner structure of claim 2, wherein each of the insulating members includes one or more reinforcing plates connecting the lower plate and the middle plate in the lower insulator to reinforce the lower insulator.

5. The corner structure of claim 4, wherein the reinforcing plates are arranged parallel to each other within the lower insulator, a mastic is interposed between each of the insulating members and the hull structure wall, and the mastic is located on a straight line with the reinforcing plate.

6. The corner structure of claim 1, further comprising:
a middle insulator disposed in a space surrounded by two insulating members oriented in different directions and the hull structure wall.

7. The corner structure of claim 1, further comprising:
a curved member disposed between upper plates of the two insulating members to support the sealing wall and having a curved surface facing an inside of the storage tank.

8. The corner structure of claim 1, wherein among the two sheets of plywood, a first plywood located on a lower side includes a concave portion in which the flange portion is seated, and a second plywood located above the firstplywood includes an opening through which the primary joint portion and the secondary joint portion pass, and
the flange portion is interposed between the first plywood and the second plywood in the concave portion.

9. The corner structure of claim 8, wherein a length and width of the concave portion are greater than a length and width of the flange portion, and a length and width of the opening portion are greater than a length and width of the secondary joint portion.

10. A liquefied gas storage tank including a corner structure installed at a corner,
wherein the corner structure comprises:
two insulating members disposed on an inner surface of a hull structure wall to be oriented in different directions;
a sealing wall preventing leakage of liquefied gas; and
a movable member installed on each of the insulating members and to which the sealing wall is attached,
wherein the movable member is coupled to be slidably displaced with respect to each of the insulating members,
the sealing wall includes a primary membrane and a secondary membrane,
the movable member includes a primary joint portion to which the primary membrane is attached, a secondary joint portion formed to have a step difference from the primary joint portion, to which the secondary membrane is attached, and a flange portion extending from the secondary joint portion for coupling with each of the insulating members,
the flange portion is slidably interposed between upper plates of each of the insulating members formed of two sheets of plywood, so that each of the insulating members and the movable member are combined to be relatively slidably displaceable, and
the secondary joint portion and the flange portion are formed by bending a sheet of metal, and the primary joint portion is formed by adhering a metal rod having a rectangular cross-section or a U-shaped section steel formed by bending a sheet of metal to the secondary joint portion.

11. The liquefied gas storage tank of claim 10, wherein a planar structure is disposed around the corner structure,
the planar structure includes a secondary insulating panel installed on the hull structure wall and a primary insulating panel adhered to the secondary insulating panel to be adjacent to the sealing wall,
the primary insulator included in the primary insulating panel and the secondary insulator included in the secondary insulating panel are formed of an insulator of the same material, and the secondary insulator has a density lower than a density of the primary insulator, and
the secondary insulating panel includes one or more secondary reinforcing plates for reinforcing the secondary insulator in the secondary insulator.

12. The liquefied gas storage tank of claim 10, wherein the sealing wall includes a primary membrane in direct contact with liquefied gas and a secondary membrane installed to be spaced apart from the primary membrane by a predetermined distance, and
a support plate is interposed between the primary membrane and the secondary membrane to maintain a constant interval therebetween.

* * * * *